(12) United States Patent
Hashimshony et al.

(10) Patent No.: US 7,108,205 B1
(45) Date of Patent: Sep. 19, 2006

(54) DRIP IRRIGATION SYSTEM EMPLOYING PARALLEL ADJACENT FLOWPATHS

(75) Inventors: Rami Hashimshony, Pardes-Hanna (IL); David Havazelet, Kibbutz Merchavia (IL); Shay Joseph Mamo, La Jolla, CA (US)

(73) Assignee: D.R.T.S. Enterprises Ltd., San Diego, CA (US)

( * ) Notice: Subject to any disclaimer, the term of this patent is extended or adjusted under 35 U.S.C. 154(b) by 0 days.

(21) Appl. No.: 11/070,707

(22) Filed: Mar. 1, 2005

(51) Int. Cl.
*B05B 15/00* (2006.01)

(52) U.S. Cl. .................. 239/542; 239/547; 239/533.1; 239/568; 239/566; 239/562

(58) Field of Classification Search .............. None
See application file for complete search history.

(56) References Cited

U.S. PATENT DOCUMENTS

| | | | | |
|---|---|---|---|---|
| 3,672,571 A | * | 6/1972 | Goodricke | 239/145 |
| 3,896,999 A | * | 7/1975 | Barragan | 239/107 |
| 3,981,452 A | | 9/1976 | Eckstein | |
| 4,199,106 A | | 4/1980 | Kojimoto et al. | |
| 4,307,841 A | * | 12/1981 | Mehoudar et al. | 239/542 |
| 4,330,222 A | * | 5/1982 | Klein | 405/48 |
| 4,392,616 A | * | 7/1983 | Olson | 239/271 |
| 4,460,129 A | * | 7/1984 | Olson | 239/542 |
| 4,473,191 A | | 9/1984 | Chapin | |
| 4,600,152 A | | 7/1986 | Samueli | |
| 4,807,668 A | | 2/1989 | Roberts | |
| 4,824,025 A | * | 4/1989 | Miller | 239/542 |
| 5,111,996 A | | 5/1992 | Eckstein | |
| 5,591,293 A | | 1/1997 | Miller et al. | |
| 5,615,838 A | * | 4/1997 | Eckstein et al. | 239/533.1 |
| 5,688,072 A | | 11/1997 | Meyer et al. | |
| 6,237,283 B1 | * | 5/2001 | Nalbandian et al. | 47/48.5 |
| 6,308,902 B1 | | 10/2001 | Huntley | |
| 6,371,390 B1 | | 4/2002 | Cohen | |
| 6,382,530 B1 | | 5/2002 | Perkins | |
| 6,620,278 B1 | | 9/2003 | Harrold et al. | |

\* cited by examiner

*Primary Examiner*—Eric Keasel
*Assistant Examiner*—Trevor McGraw
(74) *Attorney, Agent, or Firm*—Donn K. Harms

(57) ABSTRACT

A drip irrigation tube having a plurality of sequentially placed emitters formed on an interior wall of the tube. Each emitter employs a series of parallel flowpaths axially positioned along the tube to provide for closer proximity of inlet ports to discharge chambers thereby providing for closer spacing of the emitters. Overlapping of the inlet portion of the sequentially positioned emitters with the outlet portion of any preceding emitter provides for even more compact positioning of the emitters along the tube.

9 Claims, 6 Drawing Sheets

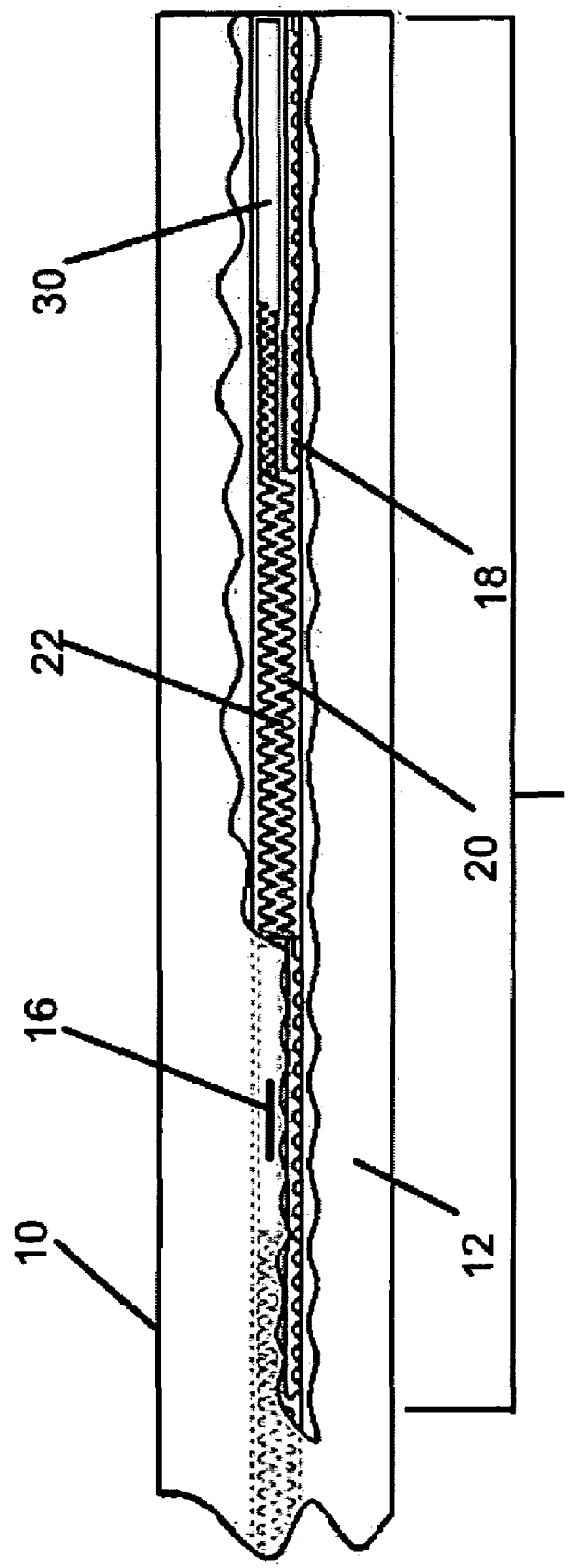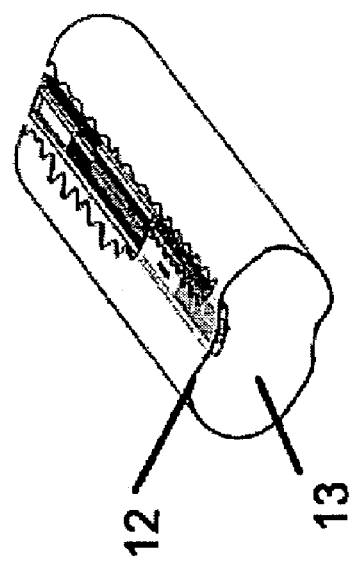

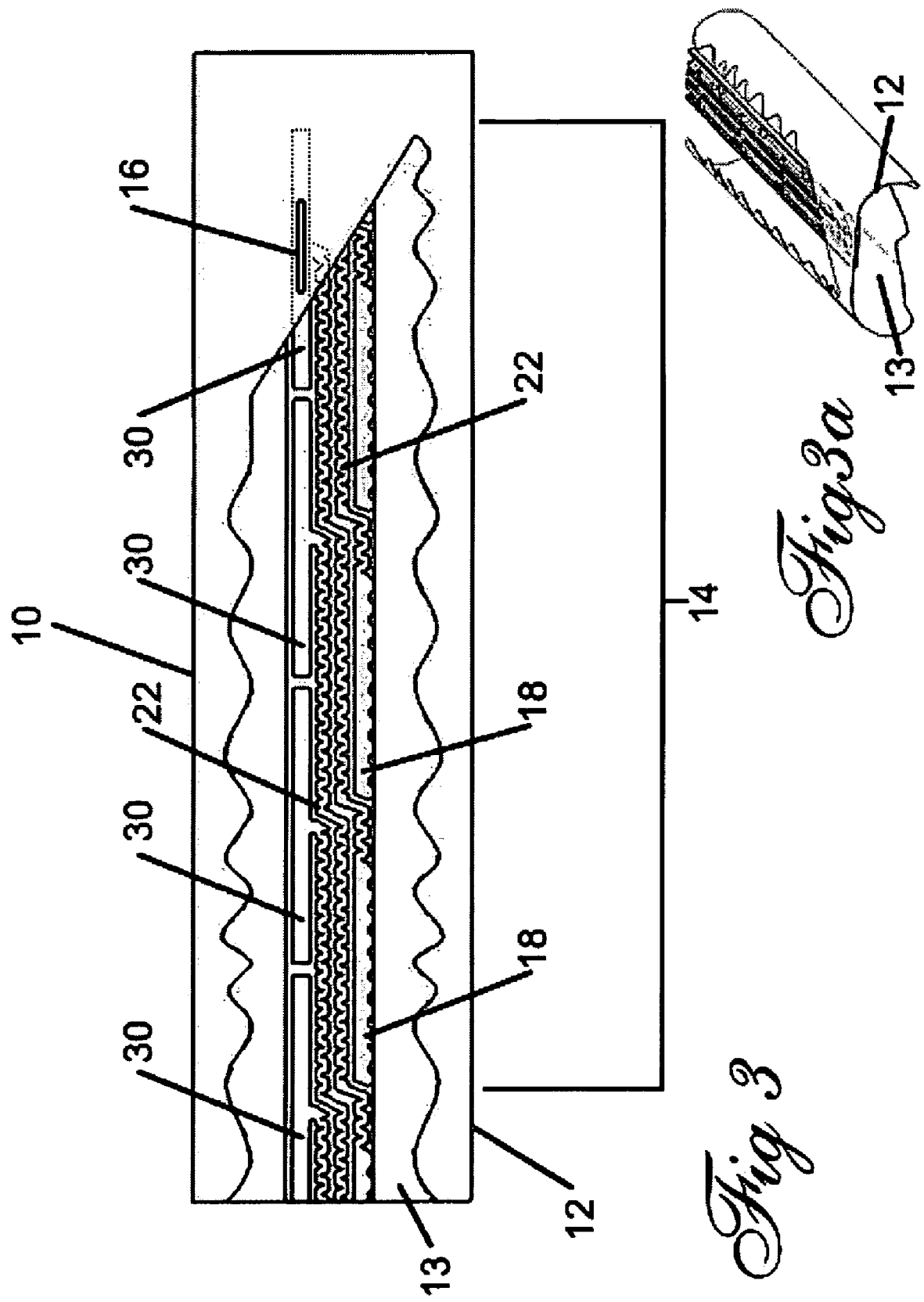

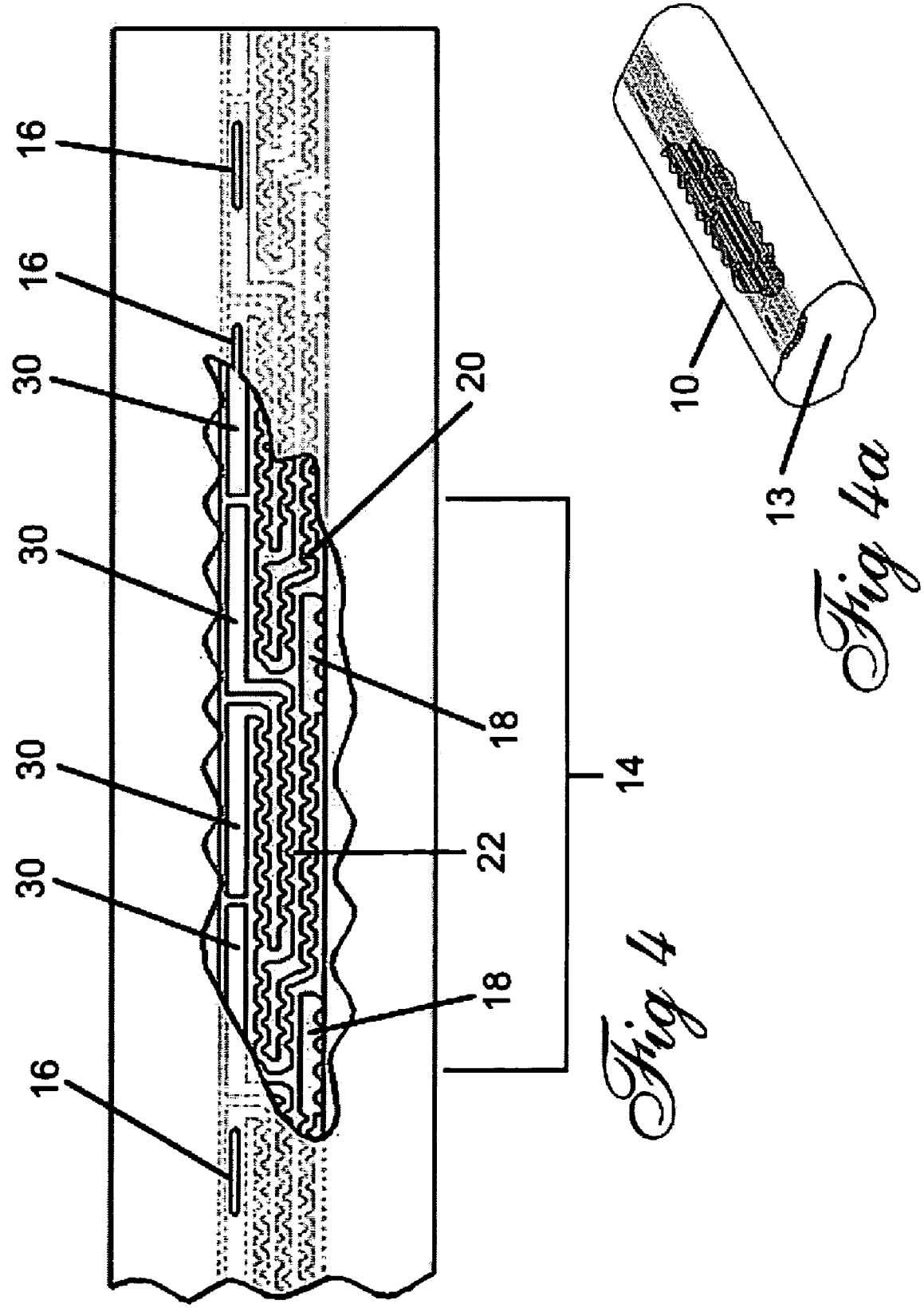

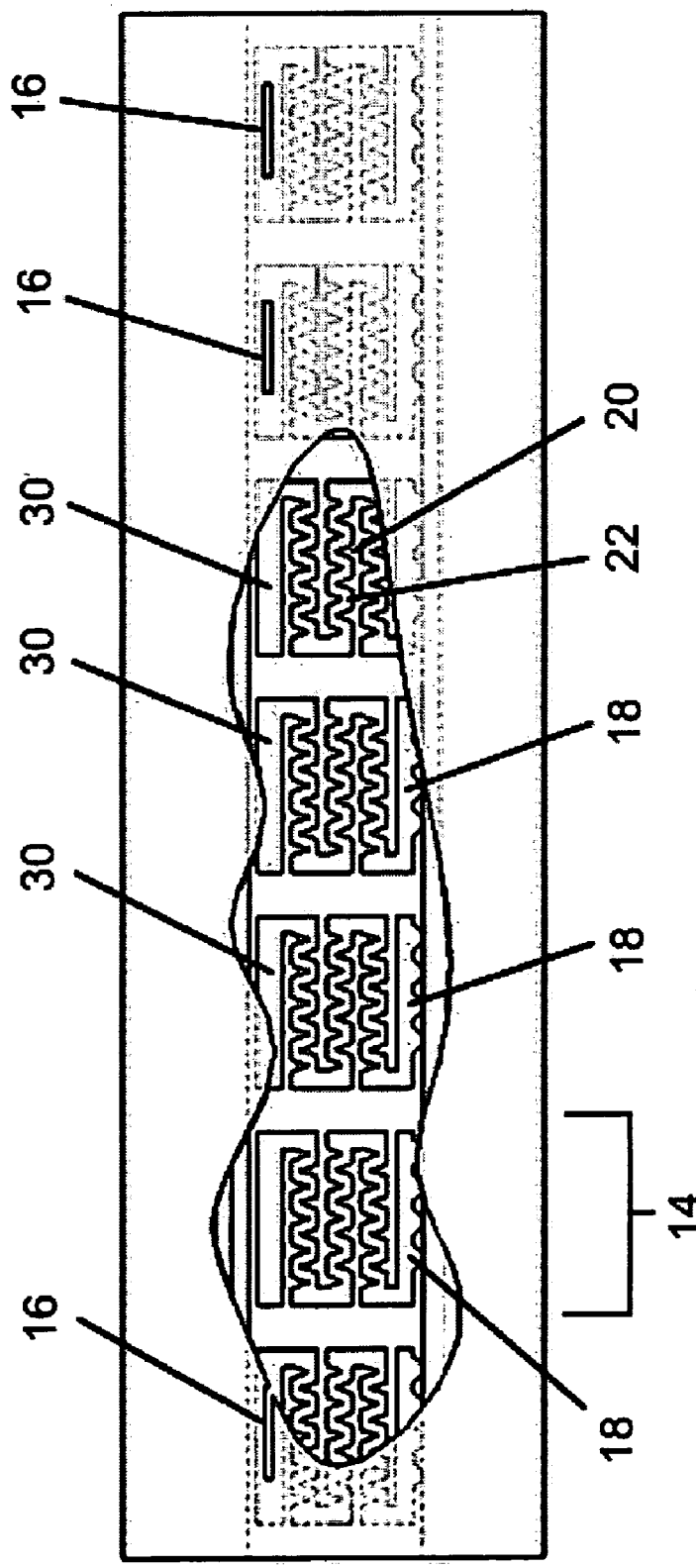
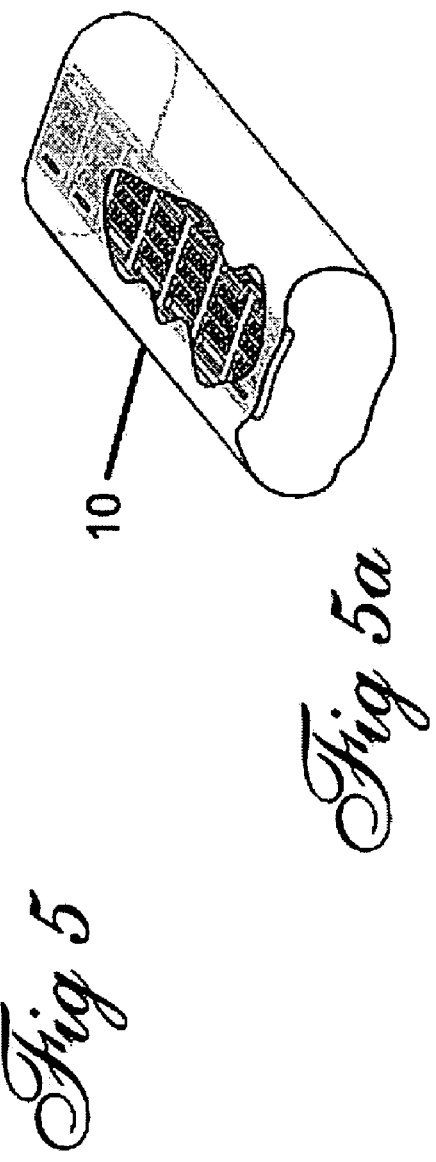

DRIP IRRIGATION SYSTEM EMPLOYING PARALLEL ADJACENT FLOWPATHS

FIELD OF THE INVENTION

The invention herein disclosed and described relates to drip irrigation. More particularly it relates to fluid disbursing hose or tape featuring a novel compartmentability scheme which enables the feeding of the labyrinth communicating fluid to each discharge chamber of an emitter, by fluid inflow coming from one or a plurality of adjacent substantially parallel inlet ports. Such a fluid path not only helps in eliminating the vexing problem of blockage, but it also provides for equalized fluid flow characteristics and closer spacing of the drippers disbursing fluid along the tube or tape. The device provides the additional benefit of lowering the disparity of pressure amongst the sequentially spaced emitters along a drip irrigation conduit.

BACKGROUND OF THE INVENTION

Conventional drip irrigaters are pressure-reducing devices which are employed to provide a continuous and relatively low-volume water supply to the roots of plants normally at a predetermined drip flow rate. Communication of water to the plants in this fashion has been found to be an excellent means for water conservation while at the same time providing the plants with a water supply that can be tailored in flow, duration, and frequency to the plants being fed.

Various drippers have been developed over the years, with a favored design employing a long tubular hose made of a thermoplastic polymer or some other durable flexible material for communicating water. The conduit or hose employs a plurality of outlet ports or drippers at predetermined distances from one to the other for the irrigation task at hand. Water or water and fertilizer or chemicals the plants require is communicated under pressure through the pipe or hose, wherein it outflows from the drippers or other disbursing components at a predetermined continuous drip rate.

Conventionally available drip irrigaters generally employ a water inflow into a hose that is communicated to a turbulent flow section usually formed by a labyrinth, zig-zag or other pattern, via a plurality of inlet ports from the hose fluid supply. The labyrinth features a plurality of capillaries that give the labyrinth an operative shape, cross section and length, to output water at a predetermined flow rate that is desirable.

From the turbulent flow through the labyrinth, water flows to a discharge chamber which acts as a reservoir to accumulate water returned to a laminar flow, which thereafter water flows to one or a plurality of outlet ports located in the outer surface of the pipe and in the direction of the root of the thirsty plant. A constant drawback of this type of arrangement of irrigaters is the dependence of a single feed communicating water from the hose supply from the inlet ports to the outlet ports and the conventional single-file arrangement of inlet ports, labyrinths, discharge chambers, communicating with downline outlet ports. Also, the requirement to use a labyrinth passageway having water capillaries of respectively narrow diameter to regulate flow increases the dependence of the device on the single labyrinth communicating with the single feed.

U.S. Pat. No. 4,473,191 (Chapin) discloses an elongated fluid distribution hose that features an overlapping hose wall which nests a labyrinth. While Chapin allows for multiple input paths from the interior of the hose to the formed labyrinth between the two walls, it is essentially still linear in construction and thereby limits the space where emitters or drippers might be place in proximity to each other due to the sequentially inline positioning of the filters, labyrinths and discharge chambers.

U.S. Pat. No. 6,308,902 of (Huntley) features a drip irrigation hose that provides emitters with different discharge rates. Huntley, however, employs single fed labyrinths that are situated in-line on the hose and because of the lengths required for the various pressure levels require an in-line or linear arrangement thus limiting the potential spacing of the drippers or emitters to each other.

U.S. Pat. No. 6,382,530 (Perkins) describes a pressure compensating drip irrigation tape using a flexible tube communicating an internal fluid flow to a plurality of secondary flowpaths. All of the secondary flowpaths of Perkins however are linear and thereby limit the proximity of the emitters or drippers to each other based on the size of the labyrinth and reservoir required to feed each dripper at the desired constant rate.

As such, there is an unmet need for a drip irrigation hose or tube system that allows for the drippers to be spaced closer together than the conventional in-line flowpath design of labyrinths will allow. Such a system should provide multiple inputs and hence multiple filters for the inflow of fluid to the labyrinths to prevent clogging. Such a system, providing multiple inflows of fluid to the labyrinth should also provide for turbulent flows to help decrease water pressure. Still further, such a system should provide the additional benefit of lowering or eliminating the disparity of fluid flow rate amongst the sequentially spaced emitters along a drip irrigation conduit.

With respect to the above description, before explaining at least one preferred embodiment of the invention in detail, it is to be understood that the invention is not limited in its application to the details of construction and to the arrangement of the components and/or steps set forth in the following description or illustrated in the drawings. The various apparatus and methods of the invention herein described and disclosed are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other devices, methods and systems for carrying out the several purposes of the present disclosed device. It is important therefore that the objects and claims be regarded as including such equivalent construction and methodology insofar as they do not depart from the spirit and scope of the present invention.

Further objectives of this invention will be brought out in the following part of the specification wherein detailed description is for the purpose of fully disclosing the invention without placing limitations thereon.

SUMMARY OF THE INVENTION

The device herein disclosed and described features a novel drip irrigation tape. The tape or hose as constructed to flow water therethrough is especially adapted to enable enhanced resistance to clogging of outlet water channels and capillaries and hence water blockage of emitters along the tape. Further, the device improves the stability and consistency of flow rate of the water or fluid communicating through it and output to the drippers or emitters which is a constant concern since inconsistent flow rates will cause excess water to be communicated to some plants and not enough to others situated along the line. Still further, the parallel flowpaths provided by the system herein allow for closer spacing of the water outlet ports thereby providing for closer proximity of the plants being watered due to the even distribution of water to the soil along the path of the tape.

This drip irrigation tape features an elongated tape or hose forming a conduit carrying the fluid. The interior conduit is defined by a sidewall forming the tape. In the sidewall along the length of the tape are situated a plurality of fluid disbursement components or emitters formed of substantially parallel adjacently situated individual components. In a favored embodiment each disbursement component employs a plurality of elongated filter-like inlet ports communicating with the interior passage of the tape formed by the sidewall to increase the filtration area of the incoming water passing therethrough. The inlet ports thereby provide a conduit for the communication of filtered water from the interior of a drip irrigator tubular hose through the filter-like inlet ports and on to a labyrinth.

Each labyrinth receives the fluid from one or a plurality of inlet ports communicated from the filters, which when communicated through the serpentine labyrinth are thereby regulated for flow. The turbulent flow produced in the labyrinth provides a first means to regulate the flow rate of the water communicated from the labyrinth to a discharge chamber of the emitter at the predetermined flow rate.

Currently one favored embodiment of the device employs two inlet ports communicating along separate pathways from the filter to a labyrinth inlet. Where the two flows meet at the labyrinth inlet in a current preferred mode, they collide from opposing directions. The resulting collision of the two opposing fluid flows changes the flow into the labyrinth from substantially laminar flow provided by the filters to a turbulent flow at the point of collision and continuing into the labyrinth inlet. This provides a second means to regulate fluid flow rate in the emitter and along the entire length of the tube.

From the labyrinth the fluid is discharged at the regulated flow rate to a discharge chamber of the emitter which provides a reservoir means to accumulate fluid and help reintroduce a laminar flow for discharge from a discharge port formed by an aperture communicating from the discharge chamber to the exterior surface of the sidewall forming the tape. A plurality of filtered inlets connected to a plurality of labyrinth fed discharge chambers may also be employed so continued fluid flow is enabled should one of the filtered inlets become blocked with debris.

The drip irrigation tape as described comprises a special compartmentability in which the inlet orifices of one set of filter-like inlet ports connected to a labyrinth is directed conversely to the inlet orifices of the second set of inlet ports connected to said labyrinth. It is thus preferred that at least a portion of each labyrinth is in communication with two inlet ports to provide the maximum flow rate control. However, those skilled in the art will realize that a plurality of more than two inlet ports might be used and placed in an adjacent parallel flow to still achieve the desired spacing and flow control and such is anticipated.

The material for the irrigation tape in a current preferred mode of the device is described herein as a flexible thermoplastic polymer such as polyethylene or polypropylene plastic material. However, those skilled in the art will realize that other materials may be used depending on the ultimate location of the tape and other materials suitable to the purpose are also envisioned in the scope of this device.

Of course another feature of this invention is the method of production of an improved irrigation tape which yields more constant fluid flow characteristics as well as the unique ability to closely space the outlets feeding the plants that is not provided by current in-line designs for such irrigation tape. As a method the steps employed to produce the improved tape would include formation of individual fluid disbursement assemblies or emitters, sequentially along the sidewall of the tape as it is extruded, in the steps of:

(A) extruding a heated long strip of flexible thermoplastic material of the hose having an internal cavity defined by the internal surface of the hose sidewall;

(B) forming a plurality of fluid disbursement assemblies sequentially along the hose as it is being extruded, each assembly having:
   (i) at least one filtered inlet, communicating at an inlet end with the internal cavity and at an outlet end with the intake for a at least one labyrinth;
   (ii) at least one labyrinth having an intake and outlet, with the intake communicating with the outlet from the filtered inlet;
   (iii) a discharge chamber communicating with the outlet from each labyrinth; and
   (iv) at least one aperture through the sidewall to communicate with each discharge chamber to provide fluid disbursement from the discharge chamber to outside the hose.

(C) forming each fluid disbursement assembly with parallel adjacent flowpaths where the filtered intake from a subsequent fluid disbursement assembly begins before the end of the preceding discharge chamber, thereby overlapping each preceding fluid disbursement assembly with the subsequent fluid disbursement assembly in the sequence along the hose.

The above steps can be altered by adding a plurality of filtered inlets parallel to each other in adjacent flowpaths which begin along the hose prior to the end of the preceding fluid discharge chamber thereby providing multiple filtered inlets and closer spacing of the assemblies by employing substantially parallel adjacent flowpaths which overlap.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

In this respect, before explaining at least one embodiment of the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide an improved drip irrigation tape comprising an elongated tubular hose made of thermoplastic polymer and employing a large water supply passage, feeding multiple fluid outlets.

Another object of the present invention is to provide a useful design and method for production of a drip irrigation tape.

An additional object of this invention is the provision of a drip irrigation tape with individual fluid disbursement assemblies having substantially parallel adjacent flowpaths overlapping adjacent fluid disbursement assemblies thereby allowing for closer proximity of disbursement assemblies.

A still further object of this invention is the provision of a drip irrigation tape employing dual filtered inputs communicating fluid to each discharge chamber which provides a more constant and reliable fluid flow to all of the respective fluid disbursement assemblies in the sequence along the tape.

Yet another object of this invention is the provision of a drip irrigation tape which resists clogging due to multiple flowpaths and filtering.

A still further object of this invention is the provision of drip irrigation tape that employs parallel input and discharge flowpaths to provide improved minimum spacing between the emitters while allowing longer labyrinths in shorter distances, thereby allowing lower flow rates as well as closer spacing.

Yet another object of this invention is the provision of drip irrigation tape with additional fluid flow control provided by opposing fluid streams in the fluid disbursement assembly.

Another object of this invention is the provision of drip irrigation tape which minimizes the disparity of flow rates amongst the sequentially spaced emitters along a drip irrigation conduit.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings wherein the detailed description is for the purpose of fully disclosing the invention without placing limitations thereon.

BRIEF DESCRIPTION OF THE FIGURES

FIG. 2 schematically presents a top view of lateral cross section of a portion of another preferred embodiment of the drip irrigator tubular hose with parallel overlapping fluid disbursement assemblies.

FIG. 2a depicts a perspective view of FIG. 2.

FIG. 3 depicts an embodiment of the device which employs four substantially parallel adjacent flowpaths for fluid flow.

FIG. 3a is a perspective view of FIG. 3.

FIG. 4 depicts another preferred embodiment of the device with a plurality of discharge chambers sharing a first section of labyrinth.

FIG. 4a is a perspective view of FIG. 4.

FIG. 5 depicts another preferred embodiment of the disclosed device where sequentially placed disbursement assemblies each employ a multiple substantially parallel flowpath configuration.

FIG. 5a is a perspective depiction of FIG. 5.

DETAILED DESCRIPTION OF THE PREFERRED EMBODIMENTS OF THE INVENTION

Figure 1:
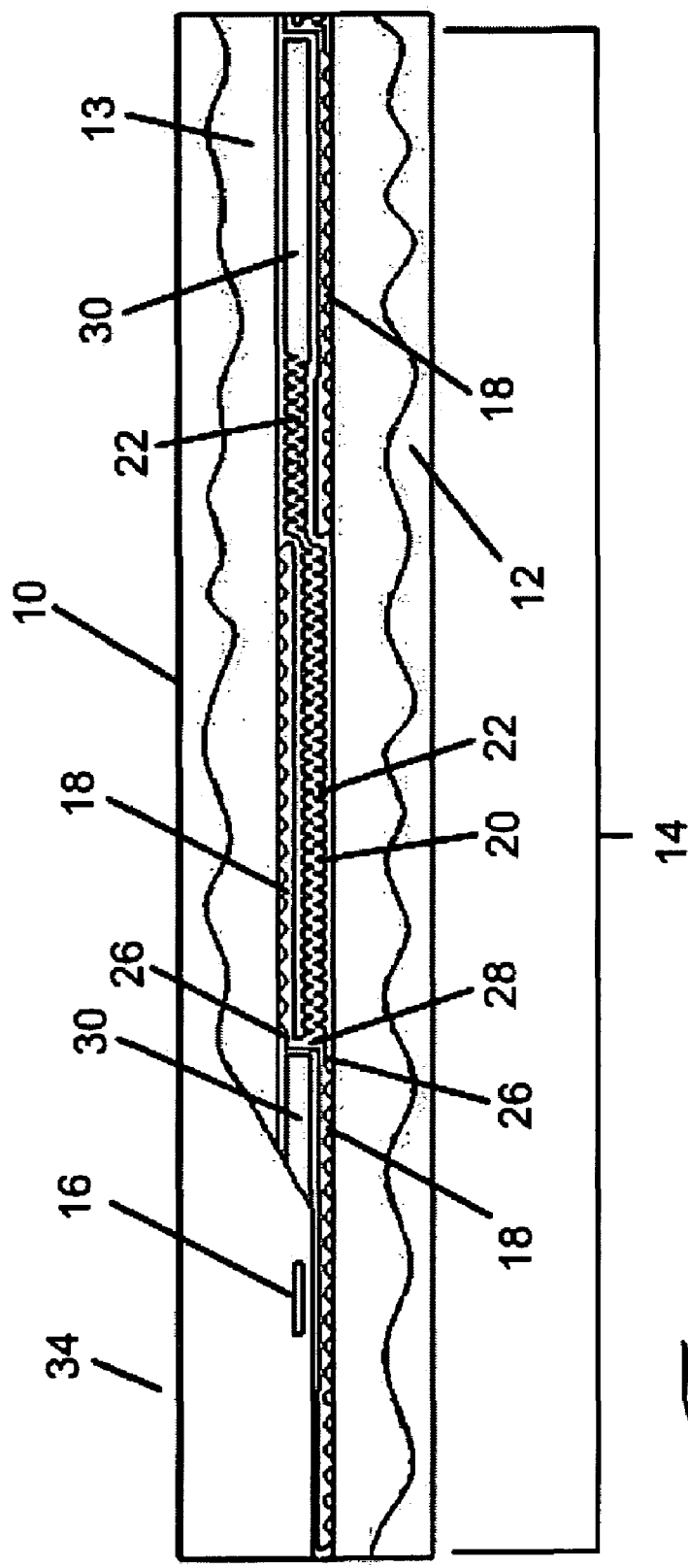
FIG. 1 schematically presents a lateral cross section of a portion of the drip irrigation tape from a top view showing a preferred fluid disbursement assembly made up of connected components.
Figure 1A:
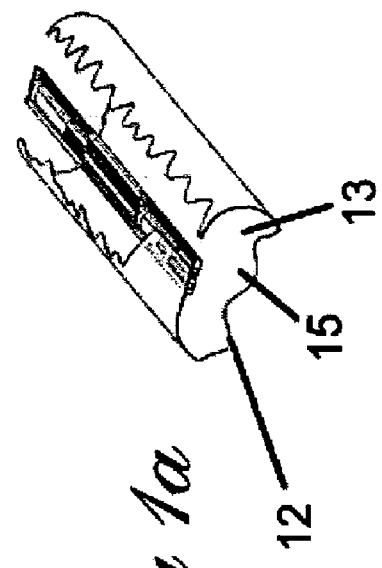
FIG. 1a is a perspective cut away view of FIG. 1.

Referring now to the drawings, FIGS. 1–6 depict the various embodiments and engagements of the disclosed method and apparatus of the drip irrigation device 10. As shown in FIG. 1, which depicts a lateral cross-section of a portion of the drip irrigator tape according to one embodiment of the present invention. More specifically, FIG. 1 shows a segment of the tape or hose 12 having a plurality of sequentially positioned individual fluid disbursement assemblies 14 or emitters providing regulated communication of pressurized fluid flowing inside the interior passage 13 or conduit defined by the sidewall 15 of the hose 12, to sequentially positioned means for discharge, currently shown by the outlet port 16. As is the case with all embodiments of the device 10, the fluid intake for the subsequent sequentially positioned fluid disbursement assembly 14 begins prior to the termination of the fluid outlet for the preceding fluid disbursement assembly 14 using substantially parallel adjacent flowpaths. This provides for closer spacing of the individual sequentially placed fluid disbursement assemblies along the hose 12 and other benefits already described.

As would be obvious to those skilled in the art, the number of sequentially positioned individual fluid disbursement assemblies 14 is only limited by the ultimate length of the hose 12 and required spacing between each individual disbursement assembly 14 which as noted above. That spacing is enhanced in the device herein providing great utility to the user in eventual plant spacing, by the structure and parallel placement of the components of the disbursement assemblies 14.

Each fluid disbursement assembly 14 employ a plurality of elongated filter inlet ports 18 communicating with the interior passage 13 of the tape formed by the sidewall 14. In a preferred mode of the device, two or more filter inlet ports 18 which function as fluid filters, communicate fluid or water from the interior passage 13 to a labyrinth 20. However, so long as parallel placement of fluid paths is maintained, the use of one inlet port 18 can be employed and still provide the increased number and closer spacing of outlet ports 16 for irrigation and the aforementioned benefits thereof.

In the preferred embodiment of FIG. 1, the water the labyrinth 20 receives from the inlet ports 18 is then communicated through the capillaries 22 forming the generally serpentine flowpath of the labyrinth 20 which creates turbulent flow and thereby regulates the fluid flow rate exiting the labyrinth 20. The labyrinth 20 thereby provides a first means to regulate the fluid flow rate of the water directed from the labyrinth 20 to the discharge chamber 30 at a predetermined fluid flow rate.

As noted, a favored embodiment of the device 10 features two elongated inlet ports 18 filtering the water communicated from the interior passage 13 and thereafter communicating that water along separate internal fluid conduits 26 to a labyrinth inlet 28. Where the two flows from the internal conduits 26 meet at the labyrinth inlet 28, in a current preferred mode, they do so in opposing directions thereby disbursing the fluid flow into the labyrinth inlet 28 in opposing flows. Opposing the two flows causes a fluid collision of the two thereby change the fluid flow from substantially laminar to a turbulent flow at the point of collision and continuing into the labyrinth inlet 28. This creation of turbulent flow by colliding opposing flows with each other at the entrance to the labyrinth 20 thereby provides a second means to regulate fluid flow in the device 10.

From the labyrinth 20, the fluid communicated therethrough is discharged at the regulated flow rate through another internal conduit 26 and on to a discharge chamber 30 which functions as a means to collect fluid in a turbulent state and change it to fluid flowing in a laminar state for discharge. The laminar flowing fluid thereafter is communicated to a means for fluid discharge such as outlet port 16 communicating through the sidewall or other means for fluid discharge through the sidewall 15 to the area surrounding the exterior surface 34 of the hose 12.

Employing one or both means to control flow rate of the fluid as noted helps to decrease the length of labyrinth 20 required for a specified flow rate, thus allowing closer spacing of the outlet ports 16. A plurality of outlet ports 16 communicating through the sidewall 15 may be employed in communication with the labyrinth-fed discharge chambers 30 so drip irrigation is enabled continuously even if one of the outlet ports 16 is blocked since the others will continue to drain the discharge chamber 30.

As shown, the device 10 features a substantially parallel configuration that allows for closer spacing of the individual disbursement assemblies and hence outlet ports 16 to a closer proximity than would normally be available with conventional in-line configurations. This is accomplished by the substantially parallel adjacent placement of the elongated inlet ports 18 with the elongated labyrinths 20 and elongated discharge chambers 30 in the positioning on the sidewall 15 of the hose 12. Also, an inlet port 18 begins on one adjacent parallel flowpath before the discharge chamber 30 ends, on the adjacent parallel flowpath of the preceding disbursement assembly.

FIG. 2 depicts a lateral cross section of a portion of another preferred embodiment of the drip irrigator device 10 which provides similar spacing enhancement by employing parallel adjacent overlapping flowpaths for water. This embodiment overlaps the parallel situation of the elongated inlet ports 18 used for filtered inlet of the water with the terminating elongated discharge chambers 30 of the preceding fluid disbursement assembly 14. The elongated filtered inlet ports 18 begin on their respective path before the terminating edge of the discharge chamber 30 of the preceding fluid disbursement assembly 14 resulting in an overlap of the components of the preceding assembly with the subsequent assembly. By employing this overlap of the two adjacent substantially parallel fluid flowpaths, the individual fluid disbursement assemblies 14 may be spaced closer together which allows for closer spacing of the outlet ports 16 thereby affording similar spacing benefits of the first embedment. The employment of the labyrinth 20 to regulate flow rate provides the desired discharge rate from the outlet ports 13.

FIG. 3 depicts another favored embodiment of the device 10 which employs the same substantially parallel adjacent flowpaths for water in four different flowpaths. In this embodiment the discharge chambers 30 are placed in line along a first flowpath and are fed fluid through an elongated labyrinth 20 which is configured to flow along two adjacent parallel flowpaths sandwiched between the first flowpath and a fourth flowpath. In the fourth flowpath are situated all of the filtered inlet ports 20 substantially in line with each other much like the discharge chambers 30 in the first flowpath. This configuration, employing a plurality of adjacent, substantially parallel flowpaths for the water, allows for closer spacing of the discharge chambers 30 and the outlet ports 16. As can be seen, using the four flowpath configuration the inlet port 18 for each subsequent disbursement assembly 14 begins before the termination of the discharge chamber 30 of the two preceding disbursement assemblies 14.

FIG. 4 depicts another preferred embodiment of the device 10 featuring a plurality of flowpaths running axially along the hose 12 in each sequentially positioned disbursement assembly 14. In this embodiment, each disbursement assembly 14 has two discharge chambers 30 which are positioned in line along a first flowpath. The inlet ports 18 are positioned along a second flowpath opposite the first flowpath and substantially parallel to it. Sandwiched in between the first and second flowpaths is located the labyrinth 20 which occupies three parallel flowpaths in its communication between the inlet port 18 and the two discharge chambers 30. This embodiment using a first labyrinth portion to feed fluid to two individual labyrinths 20 which communicate with respective discharge chambers 30 provides for close spacing of the sequentially located discharge chambers 30 and outlet ports 16 using the multiple substantially parallel flowpath configuration. This also decreases the disparity of individual flow rates between sequentially spaced drippers.

FIG. 5 depicts another preferred embodiment of the disclosed device 10 wherein the sequentially placed disbursement assemblies 14 employ a multiple substantially parallel flowpath configuration. In this embodiment, the discharge chambers 30 are positioned inline along a first flowpath and the elongated inlet ports 18 filtering incoming water are situated inline along the opposite side along a second flowpath. Sandwiched in between the first and second flowpaths are the labyrinth 20 communicating fluid in multiple parallel flowpaths from the inlet ports 18 to the discharge chambers 30. This embodiment, while not overlapping the components of the subsequent discharge assembly with the previous discharge assembly 14, does employ a plurality of adjacent substantially parallel flowpaths to provide closer spacing of the discharge assemblies 14 and outlet ports 16.

Figure 6:
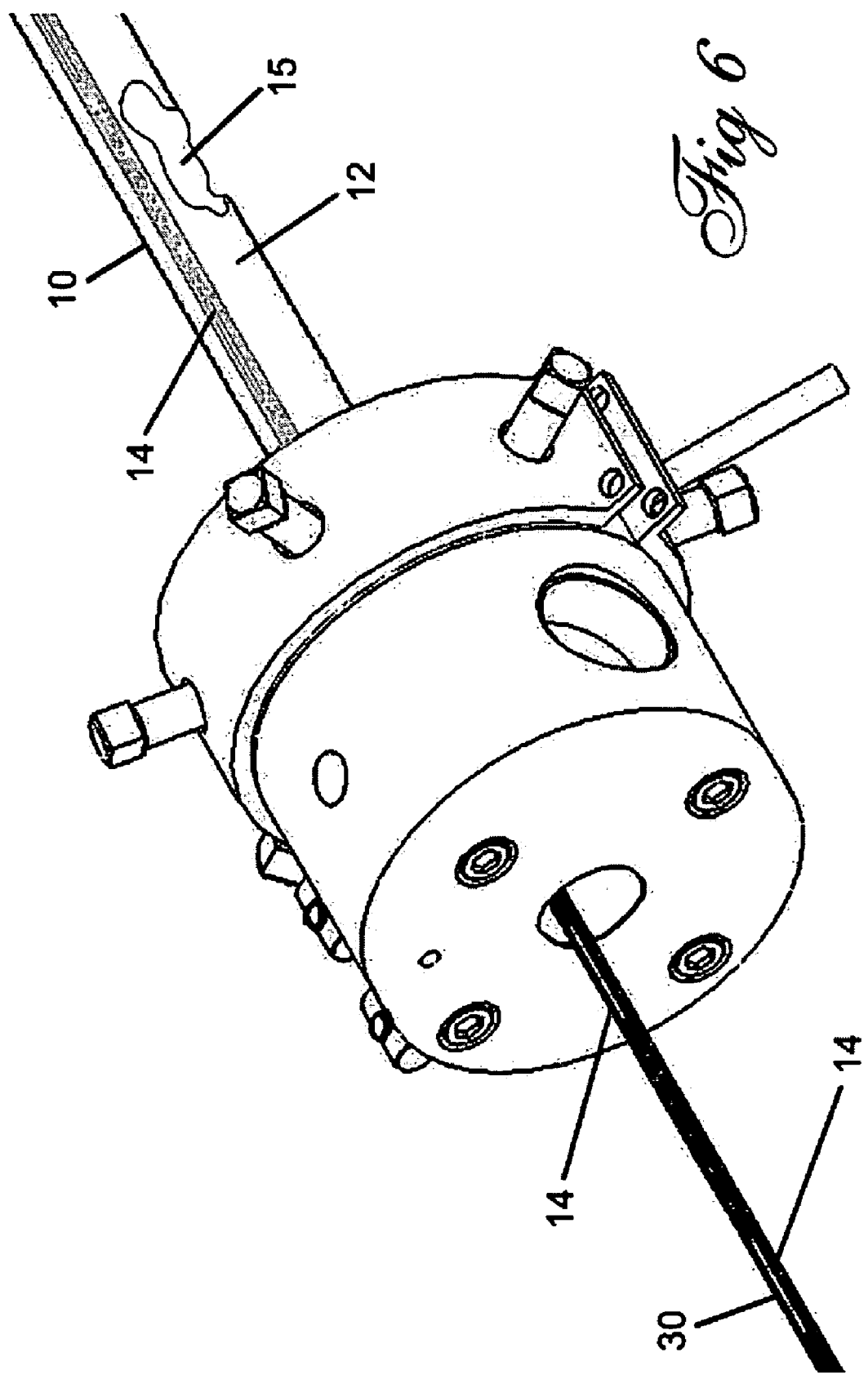
FIG. 6 depicts formation of the device wherein the sequentially positioned disbursement assemblies are formed onto a tape which is melded to the sidewall of the hose during extrusion of the hose as described in the process herein.

FIG. 6 depicts the method of forming the device 10 wherein the sequentially positioned disbursement assemblies 14 are formed on the sidewall 15 of the hose 12 during extrusion of the hose 12. The joining of the disbursement assemblies can be accomplished by preforming them on a strip or substrate and melding them to the interior wall of the hose 12 during extrusion of the hose 12 or otherwise forming them on the wall surface as the hose 12 is extruded. The strip may also be placed in between overlapping portions of sidewall in a sandwiched fashion. Once the disbursement assemblies 14 are sequentially positioned on the interior surface of the sidewall 15 and the hose 12 fully formed, the outlet ports 16 may be punched through the sidewall 15 in the appropriate positions to communicate with the sequentially spaced discharge chambers 30. The location of each of the discharge chambers 30 may be determined in a number of ways from timing the distance of travel of the hose 12 through the extruder to using sonar to determine the position for the punching operation of the outlet ports 16. All embodiments of the device 10 would be adhered or formed on the interior surface of the sidewall 15 forming the internal conduit 26 during the extrusion process.

Although the invention has been herein disclosed and described with respect to particular embodiments thereof, it should be realized that various changes and modifications may be made therein without departing from the spirit and scope of the invention. While the invention as shown in the drawings and described in detail herein discloses arrangements of elements of particular construction and configuration for illustrating preferred embodiments of structure and method of operation of the present invention, it is to be understood, however, that elements of different construction and configuration and other arrangements thereof, other than those illustrated and described, may be employed in accordance with the spirit of this invention. Any and all such changes, alternations and modifications, as would occur to those skilled in the art, are considered to be within the scope of this invention as broadly defined in the appended claims.

Further, the purpose of the attached abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed is:

1. A drip irrigation apparatus comprising:
   a tube formed of a sidewall, said tube having an exterior surface and having an interior conduit defined by an inner surface of said sidewall;
   a plurality fluid disbursement assemblies positioned sequentially along said inner surface of said tube, each said fluid disbursement assemblies forming a continuous passage for communicating fluid from said interior conduit to said exterior surface, said passage defined by:
   a first flowpath for fluid running axially along said sidewall;
   a second flowpath running along said sidewall substantially parallel to said first flowpath;
   an elongated inlet port communicating with said interior conduit;
   said inlet port running axially along said first flowpath;
   an elongated first labyrinth segment running axially along said first flowpath, said first labyrinth segment having a starting end and a terminating end;
   said inlet port in sealed communication with said starting end of said first labyrinth segment;
   a discharge chamber running along said second flowpath;
   said discharge chamber in sealed communication with the termination end of said first labyrinth segment;
   said inlet sorts running along said first flowpath of each of said sequentially spaced plurality of disbursement assemblies, overlapping the discharge chamber, of each preceding fluid disbursement assembly; and
   at least one discharge port communicating through said sidewall with said discharge chamber.

2. The drip irrigation apparatus of claim 1 additionally comprising:
   a second elongated inlet port running along said second flowpath; and
   said second inlet port in sealed communication with said starting end of said first labyrinth segment.

3. The drip irrigation apparatus of claim 2 additionally comprising:
   said sealed communication between said first inlet port and said starting end of said first labyrinth segment comprises a first conduit communicating between said inlet port and said starting end of said first labyrinth segment; and
   said sealed communication between said second inlet port and said first labyrinth segment comprises a second conduit communicating between said second inlet port and said starting end of said first labyrinth segment.

4. The drip irrigation apparatus of claim 3 additionally comprising:
   said first conduit and said second conduit communicating at said starting end of said first labyrinth segment in opposing directions, whereby fluid communicated from said first conduit and said second conduit communicate in a collision of fluid flows at said starting end.

5. The drip irrigation apparatus of claim 4 additionally comprising:
   said collision providing a means to convert a laminar fluid flow from both said first conduit and said second conduit, to a turbulent fluid flow.

6. The drip irrigation apparatus of claim 1 additionally comprising:
   a third flowpath situated between said first flowpath and said second flowpath;
   a fourth flowpath situated between said third flowpath and said second flowpath;
   said first labyrinth segment running along said first flowpath in sealed communication at its termination end with a second labyrinth segment running along said third flowpath which is in sealed communication with a third labyrinth segment running along said fourth flowpath; and
   said third labyrinth segment in sealed communication at a termination end with said discharge chamber, whereby fluid communicated from said conduit through said inlet port is communicated through successive labyrinths in different flowpaths, to said discharge chamber.

7. The drip irrigation apparatus of claim 1 additionally comprising:
   a third flowpath situated between said first flowpath and said second flowpath;
   a fourth flowpath situated between said third flowpath and said first flowpath;
   a second discharge chamber axially positioned along said second flowpath substantially inline with said first discharge chamber;
   a second labyrinth segment running axially along said third flowpath in a sealed engagement between said first labyrinth segment and said discharge chamber; and
   a third labyrinth segment running axially along said fourth flowpath in a sealed engagement between said first labyrinth and a second discharge chamber.

8. The drip irrigation apparatus of claim 1 additionally comprising:
   a third flowpath situated between said first flowpath and said second flowpath;
   a fourth flowpath situated between said third flowpath and said first flowpath;
   a second labyrinth segment;

said first labyrinth segment running along said fourth flowpath in a sealed engagement to said second labyrinth segment running along said third flowpath; and said second labyrinth communicating in a sealed engagement with said first labyrinth segment and outlet discharge chamber.

9. The drip irrigation apparatus of claim 8 additionally comprising:

a fifth flowpath situated between said second flowpath and said third flowpath; and a third labyrinth segment running along said fifth flowpath in sealed engagement between said second labyrinth and said discharge chamber.

* * * * *